March 4, 1958 — N. F. BROWN — 2,825,356
PRESSURE RESPONSIVE RECIPROCATING PISTONS
Filed April 27, 1955 — 2 Sheets-Sheet 2
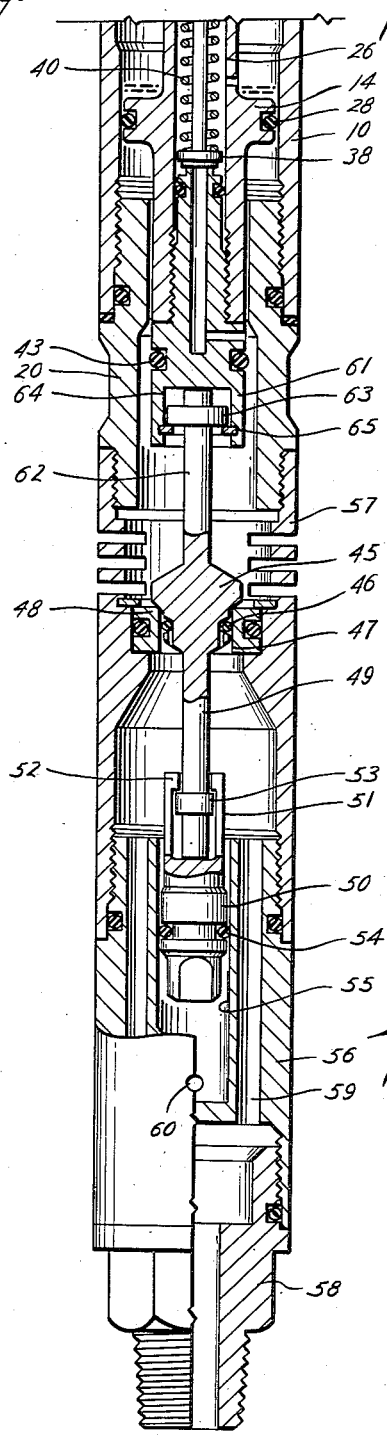
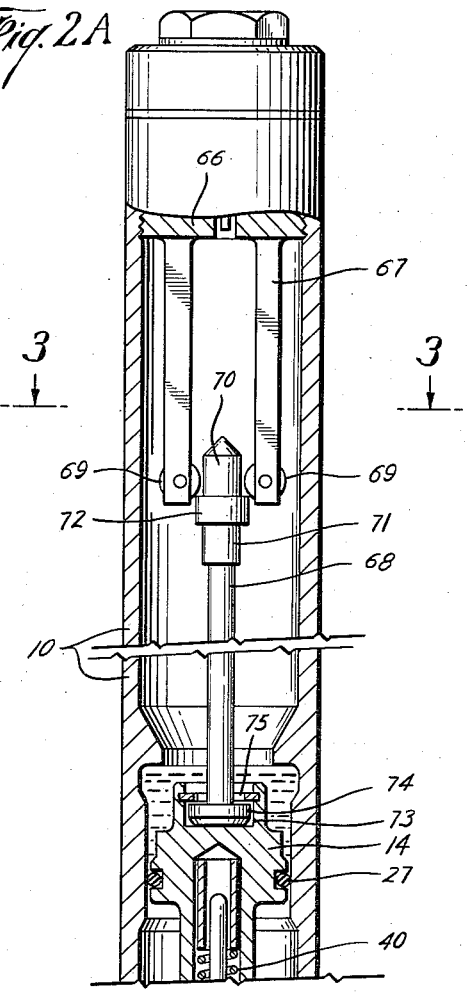
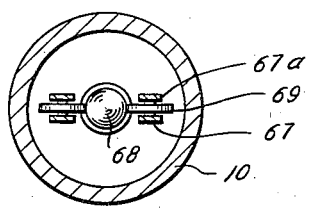
Norman F. Brown
INVENTOR.
BY
ATTORNEYS United States Patent Office 2,825,356
Patented Mar. 4, 1958

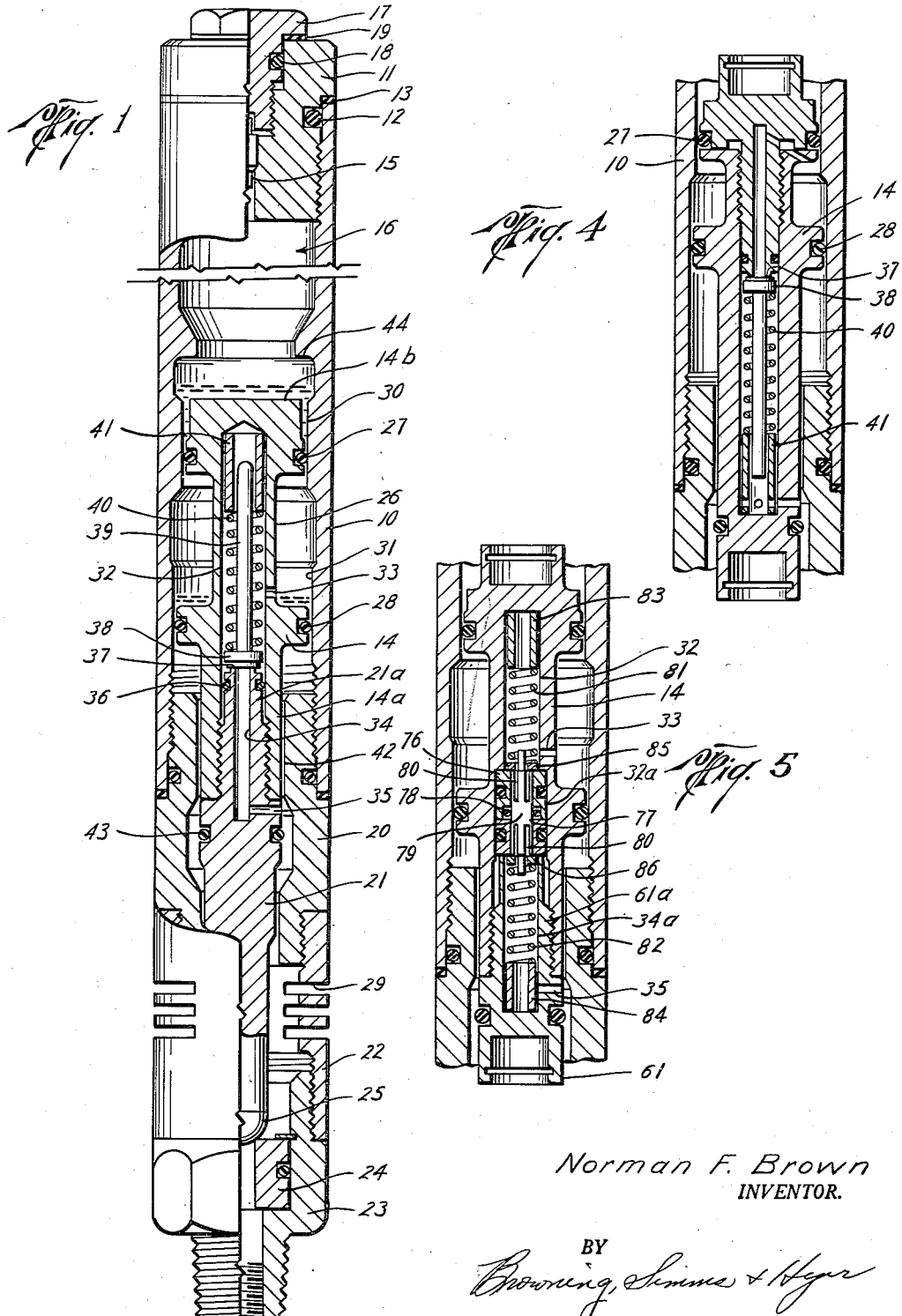

2,825,356

PRESSURE RESPONSIVE RECIPROCATING PISTONS

Norman F. Brown, Longview, Tex., assignor, by mesne assignments, to U. S. Industries, Inc., a corporation of Delaware Application April 27, 1955, Serial No. 504,307

25 Claims. (Cl. 137—155)

This invention relates to pistons and, more particularly, to pressure responsive pistons reciprocal against a fluid resistance in which it is desirable to prevent any leakage to or from the fluid resistance. In one aspect it relates to a novel double acting valve.

In United States Letters Patent to C. M. Peters, No. 2,685,886, there is shown a pressure responsive reciprocating piston having spaced seals in which the space in the piston, that is, the space between the seals, is charged to a greater or lesser value than either the operating pressure or the resistance to movement of the piston (dome pressure).

The Peters valve will operate satisfactorily for a substantial period. However, leakage may still occur past the seal means of the Peters piston and if the pressure within the pressure dome is changed due to this leakage, the operating characteristics of the valve will change.

When leakage permits the pressure within the piston to change towards equality with the dome pressure, the differential across the seal exposed to dome pressure may decrease sufficiently to permit it to roll or move about in its groove. When rolling starts, the O-ring leakage increases and a change in dome pressure may result. In some designs a comparatively small differential is sufficient to prevent rolling of an O-ring seal.

It has been found that the friction of the two O-rings, which initiates O-ring movement relative to its groove, especially the static friction on the commencement of movement of the Peters type piston after an appreciable period of rest in one position while carrying a high differential, is proportional to the differential carried by the seal yet, while low differential is desirable for this reason, a high differential is needed to extend the life of the valve.

It has also been found that an O-ring piston seal, while reciprocating in a cylinder, usually leaks while it is in motion, that leakage usually becomes virtually negligible when it is stationary, that the rate of leakage at comparatively low differentials is proportional to the differential carried, is worse if the ring can roll in its groove, and is diminished as the sliding surface is improved in fineness of finish.

It is therefore the general object of this invention to provide a pressure responsive piston movable against a fluid resistance and having spaced seals and a pressurized space inside the piston between these seals, in which the pressure is recurrently and automatically reestablished, every time a cycle of operation occurs, at a preselected value in relation to that of the fluid resistance.

Another object is to provide a pressure responsive piston having spaced seals with the piston movable against a fluid resistance, such as a pressure dome, by a changing pressure fluid in which the piston seals are protected against excessive pressures of the operating pressure fluid.

Another object is to anticipate the pressure changes in a pressure fluid used for reciprocating a piston having spaced seals against a given fluid resistance, such as a pressure dome, and utilizing the pressure difference between the piston interior pressure (that is, the space defined in part by the spaced seals) and the lowest value of the changing pressure fluid for removing from the piston interior at least once during each cycle any excess fluids to reduce the pressure in the piston to a predetermined differential with the fluid resistance, preferably at or near a zero differential.

Another object is to anticipate the pressure changes in a pressure fluid used for reciprocating a spaced seal pressurized piston against a fluid resistance, such as a pressure dome, and to utilize the pressure difference between the piston interior pressure and the highest value of the pressure fluid for replenishing any loss of pressure in the piston, at least once during each cycle of the piston, to maintain a predetermined differential between the piston pressure and the fluid resistance, preferably at or near a zero differential.

Another object is to provide a pressure responsive piston having spaced seals, one of which is exposed to a fluid resistance, such as a pressure dome, in which the pressure differential across that seal is maintained substantially constant by providing for the automatic raising or lowering of the pressure in the piston during each cycle of operation of the piston as may be required to maintain therein the desired difference from the dome pressure, preferably at or near a zero differential.

Another object is to provide for use with a chamber to be pressurized a simple double acting valve for maintaining the differential in pressure between the chamber and the outside pressure within a predetermined range.

Another object is to provide for use with a chamber to be pressurized a simple double acting valve having opposed resilient means for maintaining the valve member seated in which one resilient means is rendered ineffective when the valve member is moved in a direction opposed by the other resilient means.

Other objects, features and advantages of the invention will be apparent from a consideration of the drawings, the specification and appended claims.

The invention is applicable to any mechanism using a reciprocating piston movable against a fluid resistance by the application of a changing fluid pressure and it will be understood that while the invention is illustrated in relation to a gas lift valve the invention is not limited to this use.

In the drawings wherein there is shown by way of illustration several embodiments of my invention for use under differing conditions and wherein like reference numerals indicate like parts:

Fig. 1 is a view partly in elevation and partly in vertical cross section of a gas lift valve embodying this invention;

Figs. 2A and 2B are views partially in vertical elevation and partially in vertical cross section of a modified form of gas lift valve with it being understood that these views are continuations one of the other from top to bottom of the valve in the order of the views above enumerated;

Fig. 3 is a cross-sectional view taken along the lines 3—3 of Fig. 2A in the direction indicated by the arrows;

Fig. 4 is a view in vertical cross section through a fragment of a valve such as that shown in either Fig. 1 or Figs. 2A and 2B illustrating a modified form of the invention; and Fig. 5 is a view in cross section of a fragment of a valve such as that shown in either of Fig. 1 or Figs. 2A and 2B illustrating a still further modified form of the invention.

Generally, the objects of this invention may be accomplished by providing a two seal piston of the type illustrated in the Peters patent with a valved passageway for automatically increasing or decreasing the pressure within the space between the two piston seals during operation of the piston. In valves in which pressure in the piston will tend to decrease during use of the valve, the valve member which controls the said passageway is arranged for re-charging it and preferably is urged toward its seat by a resilient element which exerts a force whose pressure equivalent is equal to the differential between the fluid operating pressure and the dome pressure at the instant of opening of the flow valve so that the pressure in the piston will be re-established at the instant of opening of the valve and may exceed the dome pressure after the flow valve has been opened as will be described later.

Where it is expected that pressure will tend to increase inside the piston, the valve member controlling the passageway is arranged to bleed excess pressure from the piston and re-establish it at a desired value. The valve is urged toward its seat by a force whose pressure equivalent is equal to the difference between dome pressure and the lowest recurring value of the operating pressure. This will re-establish the difference between the dome pressure and the piston pressure once during each cycle of operation of the valve.

Where the pressure inside the piston may either increase or decrease, a double acting valve is provided to increase or decrease pressure as needed. Both the foregoing cases are descriptive of the conditions for regaining an inter-seal pressure equal to the dome pressure but it will be apparent that other inter-seal pressures can be recurrently re-established in order to maintain a permanent preselected differential pressure across the seal between the dome and the interior of the piston by altering the thrust of the spring urging the closure of the valve controlling the passageway between the piston interior and the exterior of the assembly.

Referring now to the drawings in detail and particularly to Fig. 1, the valve which has been chosen as the vehicle for illustrating this invention includes a piston and dome housing 10 closed at its upper end by an end closure 11. A suitable seal is provided between the housing and end closure by O-ring 12 and gasket 13. A double seal piston 14 is reciprocally mounted in housing 10 and completes the pressure dome. The details of construction and operation of piston 14 will appear below.

A valve core 15 is provided within end closure 11 for purposes of charging the pressure dome 16 within housing 10 with the desired pressure. Leakage through valve core 15 is guarded against by providing an end plug 17 in end closure 11 together with O-ring 18 and gasket 19 therebetween.

Secured to the lower end of piston and dome housing 10 is a choke housing 20 through which extends valve stem 21. Stem 21 is threadedly secured to piston 14.

A valve cage 22 is secured to choke housing 20 and a head piece 23 is secured to valve cage 22 and provides a fitting for securing the valve to a flow string of tubing.

Head piece 23 carries therein a seat 24 with which a valve member 25 carried by stem 21 cooperates to control flow of fluid through the valve.

As will be understood by those skilled in the art, head piece 23 is made up in a mandrel in a flow string of tubing in an oil well and gas is fed into the tubing through the valve of Fig. 1 to "gas lift" oil within the tubing.

Referring now more in detail to piston 14, it will be seen to comprise an elongate cylindrical member having spaced seals 27 and 28 on either side of a reduced diameter section 26. For convenience the chamber or area between seals 27 and 28 and between housing 10 and piston 14 is referred to as "the interior of the piston." The space between the seals is shown here exaggerated and it is to be understood that this capacity will usually be small in comparison with that of a dome. These spaced seals are preferably O-rings as shown. The piston 14 forms a part of the pressure dome whose pressure is exerted on the end of piston 14 which carries the O-ring 27 over an area defined by the bore 30 to move piston 14 in a direction to seat valve member 25. Cage 22 is slotted as at 29 and gas under pressure enters through slots 29, passes upwardly through choke housing 20 and is exerted on the end of piston 14 remote from pressure dome 16 over an area defined by the bore 31 and sealed by the O-ring 28 in a direction to tend to unseat valve 25. Bores 30 and 31 and the portion of housing 10 therebetween provide a cylinder within which piston 14 reciprocates to seat and unseat valve 25. O-ring 27 slides within bore 30 which is of slightly smaller diameter than bore 31 within which O-ring 28 slides. This difference is designed to insure that the pressure changes in the dome 16 caused by piston movement will be exactly duplicated in the space between the two piston seals 27 and 28. These bores may be of the same diameter if the compression ratio of the dome is small enough to be negligible.

In the Fig. 1 arrangement, the pressure within the piston is presumed to tend to diminish. In order that the pressure within piston 14 be controlled during operation of the valve and any leakage from this space be compensated for, there is provided a valved passageway connecting the interior of the piston with the exterior of the valve. This passageway comprises a central bore 32 within piston 14, a lateral passageway 33 connecting this bore with the interior of the piston, an axial bore 34 within stem 21 and communicating with bore 32, and a lateral passageway 35 connecting bore 34 with the exterior of stem 21. Passageway 35 is open to ambient fluid pressure at least during a part of each cycle of operation of piston 14.

Flow through the passageway referred to above is controlled by a check valve arranged to permit recharging piston 14. Valve stem 21 is connected with piston 14 by a male end fitting 21a which is threadedly received within a female end fitting 14a in the adjacent end of piston 14. O-ring 36 provides a seal between the male end fitting 21a and the female end fitting 14a. Male end fitting 21a provides a valve seat 37. A valve member 38 is positioned in bore 32 and cooperates with seat 37 to control flow of pressure fluid through the passageway and into the piston 14. Valve 38 has an elongate stem 39 about which there is positioned a helical spring 40 which urges the valve member 38 toward seated position. A spacer 41 between the end of spring 40 and the bottom of bore 32 acts as a guideway for the free end of valve stem 39 and by selecting the length of spacer 41, the force of the spring 40 may be varied.

The valve may be subjected to pressures greater than necessary to unseat valve member 25 and it is desirable to isolate the piston seals from this pressure. For this purpose choke housing 20 is provided with a bore 42 in which piston stem 21 and the female end of piston 14 reciprocate, and an O-ring 43 seals between stem 21 and bore 42 when valve 25 is in full open position. O-ring 43 is carried by stem 21 at a point below lateral passage 35 so that lateral passage 35 precedes O-ring 43 into bore 42 on opening of valve 25 thus isolating the interior of the piston from excessive operating pressures. After this seal is formed, piston travel is limited by abutment between the top 14b and the shoulder 44 in the dome housing 10.

A little liquid lubricant may be provided above each of piston seals 27 and 28 to reduce friction between the seals and cylinder wall.

Considering now the operation of the valve of Fig. 1, head piece 23 will be secured in a mandrel in a production string of tubing in an oil well. The exterior of the valve housing will be exposed to gas pressure used in gas lifting oil from the well. Before the valve opens the pressure in the tubing and in head piece 23 is lower than in the casing and valve cage 22. Thus, there will exist a pressure differential across the area of valve 25 which is held closed against its seat partly by a thrust which is a function of that differential. This thrust is lost as soon as the valve opens and constitutes the conventional feature of "snap-action." To open the valve the casing pressure must exceed the pressure within pressure dome 16 by an amount sufficient to overcome the above-mentioned thrust; the force of spring 40 is preselected to equate this casing-tubing differential at the opening moment. As the resistance to opening of check valve 38 is then equal to the difference between the dome and casing pressure, the check valve 38 will open when valve 25 opens and will admit pressure fluid into the piston 14 if the pressure in it is lower than dome pressure due to previous leakage past seal 28.

When valve 25 is unseated, the holding down effect of the casing-tubing differential is lost and the valve snaps open and moves towards its full open position. This movement, however, is retarded by the compression of the gas in the dome which, for the whole stroke of the piston, is greater than the regained casing-tubing differential and so some further casing pressure rise is necessary to raise the piston fully. (Where the regained differential exceeds the dome compression, a balanced valve as in Figs. 2A and 2B would be used.) This insures that the pressure re-established in the piston, just before seal ring 43 enters bore 42 and isolates it, will be governed by casing pressure, dome pressure and check valve spring and will not be effected by the casing-tubing differential which may change appreciably.

As the piston moves valve 25 from closed to open position, the pressure within the piston 14 and within pressure dome 16 will increase equally. The pressure within the space defined by O-ring 28 and choke O-ring 43 will decrease slightly but will be above the pressure within the piston by the check valve differential.

After a charge of gas has been injected into the tubing to lift oil therein, the pressure within the casing will be reduced until the force it exerts is less than the force exerted by the pressure fluid within dome 16 and valve 25 will commence its closing movement. In this type of flow valve, after the re-closing movement has progressed to a point where the approach of valve 25 towards its seat 24 creates a drop in pressure downstream, the effect is self-aggravating and results in a speed-up of the closing movement.

After the re-closure of valve 25, any tendency to leak across piston O-ring 28 would be outwardly from the piston whose pressure had been replenished when the valve opened and limited by the seal ring 43.

There may be installations where the tubing-casing pressure differential cannot be utilized for snap action and in those instances the arrangement shown in Figs. 2A and 2B may be utilized. The valve of Figs. 2A and 2B is rendered independent of casing-tubing differential to any extent up to 100 percent by providing a means for balancing the thrust effects.

In order to permit small movements of the main valve member without danger of leakage before the main valve opening movement occurs, the valve controlling flow is provided by a slide valve 45 which has a shut-off seal of resilient material such as O-ring 46 sliding within a cylindrical bore 47 within seat 48. Depending from slide valve 45 is a stem continuation 49 on which is mounted balance piston 50. Piston 50 is provided at its upper end with split retainer 51 which has a reduced diameter portion 52 at its open end. Stem continuation 49 has an enlarged radial flange portion 53 which snaps into the split retainer.

Balance piston 50 is provided with a resilient seal such as O-ring 54 sliding in a smooth cylindrical bore 55 within a by-pass housing 56 which is interposed between valve cage 57 and head piece 58. By-pass 56 has a plurality of axial gas passages 59 surrounding piston bore 55 and providing for passage of gas through by-pass 56. A cross port 60 is provided through the wall of by-pass 56 and provides fluid communication between the exterior of the valve and cylinder bore 55 so that balance piston 50 will be exposed to casing pressure on one side and tubing pressure on the other.

The area of cylindrical bore 47, with which slide valve 45 cooperates to control flow through the valve, and the area of bore 55, in which the balance piston 50 slides, are equal so that the casing pressure exerted downwardly on slide valve 45 will be opposed by an equal upward force on the balance piston 50. Likewise, the piston 50 will be subjected on its upper face to tubing pressure with a force which will be exactly balanced by tubing pressure acting on the nether face of slide valve 45. Thus, the forces acting on slide valve 45 will be exactly balanced.

For manufacture and assembly reasons an articulating joint is provided in the valve stem of this embodiment and the stem comprises two parts 61 and 62. Part 62 is integral with slide valve 45 and has a radially extending flange 63 adjacent its upper end which is received within a cup-like bore 64 within stem part 61. A snap ring 65 is received within an annular groove in bore 64 on the valve side of outturned flange 63 to secure the two halves of the valve stem together.

By balancing the casing-tubing differential across slide valve 45, the snap-action characteristics of the valve of Fig. 1 have been lost. Snap-action characteristics are, however, preferred in many instances and for this purpose there may be provided a means which will restrain the commencement of movement of the valve in either direction but, once the valve has been moved to overcome this restraint, will permit relatively free movement of the valve member and assist it towards the end of its movement.

An illustrative form of such means is depicted in Fig. 2A and Fig. 3. End closure 66 is provided with a pair of depending spring legs 67 which project into the dome and effect movement of a trip rod 68 which is carried by piston 14. The free ends of the spring legs are fitted with rollers 69 rotatably mounted in grooves 67a within the spring legs 67 to provide rolling contact with trip rod 68. The free end of trip rod 68 is provided with portions 70 and 71 which respectively occupy the space between rollers 69 when the slide valve 45 is in its full closed and full open positions. These parts 70 and 71 are separated by a radially enlarged portion 72 which will require the spring legs 67 to spread apart to permit its movement between the rollers 69. The enlargement of part 72 is such that an appreciable thrust will be required for it to force the rollers 69 apart and pass between them in either direction. Variation in the amount of thrust required may be had by varying the strength of the spring legs or the size of parts 70, 71, and 72, but the minimum will always be greater than the equivalent of the dome pressure change that results from the normal full stroke.

Trip rod 68 is secured to the end of piston 14 by an articulated joint which comprises a cup-like bore 73 within the end of piston 14 and a radial flange 74 on the end of trip rod 68 which is engaged by a split ring 75 on the dome side of the flange to hold the flange within bore 73.

The piston 14, O-rings 27 and 28, and seal-off O-ring 43 as well as check valve 38 all function in the same manner as hereinabove explained in connection with the Fig. 1 embodiment.

In operation the arrangement of Figs. 2A and 2B requires an excess of casing pressure over dome pressure that equates the resistance to spreading of spring legs 67 in order to open the valve. In like manner the force opposing closing of the valve 45 must be less than the force exerted by dome pressure by an amount equal to the resistance to spreading of spring legs 67 before the valve will close. The result is a snap acting valve. The check valve 38 should be urged toward its seat by a bias equal to the casing dome differential at the instant of opening if it is desired to maintain the differential across critical O-ring 27 at zero.

For valves in which the likelihood of leakage past seal 28 is predominantly outward, the check valve 38 and spring 40 are arranged as indicated in Figs. 1, 2A and 2B. There are instances, however, in which the likelihood of leakage past seal 28 is into the piston 14. In such case, the check valve is arranged to open upon a predetermined excess of pressure within the piston 14 over the operating fluid pressure, as indicated in Fig. 4. Here the check valve and seat are reversed from their relationship in Fig. 1 and check valve 38 is held upon its seat 37 by spring 40 and spacer 41 against the pressure within the space between the piston seals. When the pressure in the piston 14 is in excess of the casing pressure by an amount exceeding the equivalent of the force of spring 40, valve 38 will open and reduce it to a pressure determined by spring 40.

When this form of piston is initially placed in service, the space between the piston seals will be at atmospheric pressure, unless the valve is assembled under pressure, and leakage of fluid into this space will occur both from the casing and from the pressure dome. After a short period of operation, however, this leakage will pressurize the space between the piston seals to provide the desired differential. In order that the quantity of pressure fluid which may leak from the dome be kept at an insignificant minimum, the two piston seals are positioned closely adjacent each other.

The operation of the Fig. 4 embodiment is identical with that of Figs. 1 and 2 except that the pressure within piston 14 instead of being dependent upon the highest casing pressure is dependent upon the lowest to which the assembly is subjected. Thus, by selection of spring 40, the piston pressure may be maintained substantially equal to dome pressure or at a preselected difference from it, inasmuch as during each cycle of operation of the valve any excess pressure within the piston may bleed out through check valve 38. In such constructions the ring 43 may be omitted.

The form of the invention shown in Fig. 4 is particularly applicable for use in free pistons for producing oil wells and reference is made to the copending application of Henry U. Garrett and Norman F. Brown, Serial No. 534,727, filed September 16, 1955, for a specific disclosure of such use.

In some instances, such as in rapid acting valves, leakage past O-ring 28 is possible in either direction. This leakage can be anticipated and the pressure differential across the critical O-ring 27 maintained at a preselected value by utilizing two check valves to permit flow of fluid into or out of the piston 14 when the differential across O-ring 28 is more or less than predetermined limits. A preferred form of double acting check valve to control flow into and out of piston 14 is indicated in Fig. 5. In this form of two seal piston, the bore 32 within piston 14 is counterbored at 32a and a slide valve seat 76 is positioned against the shoulder of bore 32 at counterbore 32a and sealed within bore 32a by conventional O-rings. The passageway 34a within male end 61a of the valve stem is comparable in diameter with bore 32. A valve member 77 is slidable within valve seat 76 to control flow therethrough. The valve seat 76 has an O-ring 78 positioned at an intermediate point and valve 77 has an intermediate plain cylinder portion 79 which, when in engagement with O-ring 78, prevents flow through valve seat 76. Extending endwise in both directions from the central portion 79 are axial passageways or slots 80. Valve member 77 is urged toward central position by resilient means such as springs 81 and 82 bearing on opposite ends of valve member 77 and exerting forces determined by the selection of spacers 83 and 84. The springs are spaced from the ends of valve member 77 by overlapping washers 85 and 86. These washers overlap the ends of valve member 77 and seat 76 to render movement of the valve member 77 against either spring independent of the other. In this embodiment, when the pressure in the piston exceeds the casing pressure by an amount greater than the pressure equivalent of the thrust of spring 82, valve member 77 will move toward valve stem 61 until the slots 80 pass O-ring 78 permitting passage of fluid through valve seat 76 when casing pressure is low. Overlapping washer 85, meanwhile, prevents spring 81 from exerting any influence on the valve member 77. Conversely, if the pressure within the piston is reduced below casing pressure by an amount which is greater than the pressure equivalent of the thrust of spring 81, then valve member 77 will move away from stem part 61 and permit fluid to pass into the piston when casing pressure is high. By selecting spring 81 to have a thrust which equals the excess of casing pressure over dome pressure at the instant of opening of valve 25, and by selecting the thrust of spring 82 to equal the differential between dome pressure and the lowest value of the changing fluid operating pressure, the pressure within the piston may be maintained equal to dome pressure during movement of valve member 25. Similarly, instead of maintaining equality, a preselected differential can be maintained by the springs 81 and 84. It will be understood that the double acting check valve of Fig. 5 may be utilized in any structure in which it is desired to maintain a predetermined differential between a chamber and the pressure fluid to which the check valve is exposed.

Throughout the specification reference has been made to maintaining the differential across O-ring 27 constant. In most instances, this differential, as a practical matter, will be virtually constant. For example, suppose a dome pressure varies from 250 to 260 p. s. i. during its normal stroke and that the piston pressure varies likewise and is maintained at zero differential automatically by a check valve whose spring thrust equivalent is 20 p. s. i., anticipating leakage past the outer seal ring which separates recurrent ambient pressure variations between 280 p. s. i. high and atmospheric low. At zero differential the critical seal is unlikely to pass any gas in either direction. Now supposing a leakage occurred at the top of the dome and the dome pressure low diminished from 250 to 245 p. s. i., then each time the piston moved there would be a new differential of 5 p. s. i. and gas would commence to leak past the critical seal from the piston to the dome to replenish the latter.

Similarly, if gas were to leak into the dome, a change of differential from zero in the other direction would initiate a self-correcting leakage.

Thus leakage which cannot be truly eliminated is anticipated and utilized to maintain automatically the desired conditions.

From the above, it will be seen that all of the objects of this invention have been accomplished. There has been provided a piston employing spaced seals operable against a resistance (pressure dome) in which the pressure within the space between the piston seals may be automatically maintained at any desired differential with the resistance. A form of the invention has been provided for use in those instances where pressure tends to build up between the piston seals and another form for use in those instances where piston pressure tends to decrease. A further embodiment has been provided for cases in which pressure may be either gained or lost inside the piston.

There has also been provided such a piston in which a third seal is employed to isolate the two piston seals from the fluid pressure for operating the piston so that excessive pressure will not be exerted against the piston seals or trapped in the inter-seal space. This isolation feature in effect provides for successive pressure changes across a plurality of seals between the pressure dome and ambient pressure. By so doing, the tendency to leak across O-ring 28, as well as O-ring 27, is minimized.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to pressure within the dome and the other end to pressure fluid for operating the valve, and means responsive to valve operating fluid for returning the pressure within the space between said seals to a predetermined differential with dome pressure during each cycle of operation of the valve.

2. The valve of claim 1 wherein the seals are provided by O-rings.

3. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to pressure within the dome and the other end to the pressure fluid for operating the valve, a fluid passageway interconnecting the space between the seals and a space exposed to valve operating pressure during each cycle of operation of the valve, a check valve and seat controlling passage of fluid through said last-mentioned passageway, and means biasing the check valve toward its seat by a predetermined force.

4. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to pressure within the dome and the other end to the pressure fluid for operating the valve, means responsive to valve operating fluid for returning the pressure within the space between the seals to a predetermined value during operation of the valve, and means isolating said spaced seals from further increase in operating fluid pressure upon opening of the valve member.

5. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to the pressure within the dome and the other end to the pressure fluid for operating the valve, and means for maintaining the pressure within the annular space between said seals at a predetermined relationship with the dome pressure including means for automatically recharging the space between the seals upon reciprocation of the piston to replenish any leakage from said space and for exhausting any excess perssure within said space upon reciprocation of the piston.

6. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seal between the piston and cylinder, one end of said piston exposed to the pressure within the dome and the other end to the pressure fluid for operating the valve, and means for automatically charging the space between the seals with pressure fluid to a predetermined differential with the valve operating pressure during each cycle of operation of the valve and for automatically exhausting any excess pressure in said space above a predetermined differential between said space and valve operating pressure during each cycle of operation of the valve.

7. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to the pressure within the dome and the other end to the pressure fluid for operating the valve, a check valve and seat controlling charging of the annular space between the two seals, means biasing the check valve toward its seat by a force which will give a predetermined perssure differential between the valve operating fluid at the instant of unseating of the valve member and the fluid within said space to provide a predetermined relationship of pressure between the pressure dome and said space, a second check valve controlling discharge of fluid from said space between the two seals, and means biasing said second check valve toward its seat by a force which will give a predetermined pressure differential across the second check valve to reduce the pressure within said space to an amount which will provide a predetermined relationship of pressure between the pressure dome and said space during operation of the valve member.

8. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to pressure within the dome and the other end to the pressure fluid for operating the valve, means for automatically charging the space between the seals with valve operating pressure fluid to a pressure having a predetermined relationship with the dome pressure during each cycle of operation of the valve, means for isolating said spaced seals from further increase in operating pressure while the valve is in full open position, and means for automatically exhausting any excess pressure from the space between the seals after the valve member has commenced movement toward closed position to reduce the pressure within said space to a value not more than said pressure having said predetermined relationship with the dome pressure.

9. As a subcombination, a relatively reciprocal piston and cylinder therefor, one of said piston and cylinder exposed on one end to a fluid resistance and reciprocated by the application of changing fluid pressure applied to the other end, spaced annular sliding seals between the piston and cylinder, and means responsive to the changing fluid pressure for returning the pressure within the space between the seals to a value having a predetermined relationship with the fluid resistance during operation of the piston.

10. The subcombination of claim 9 wherein the seals are O-rings.

11. As a subcombination, a piston reciprocal within a cylinder therefor, said piston exposed on one end to a fluid resistance and reciprocated by the application of changing fluid pressure applied to the other end, spaced annular sliding seals between the piston and cylinder, and means for automatically charging the space between the seals with said changing fluid pressure to a value having predetermined relationship with the fluid resistance during each cycle and for automatically exhausting any excess fluid pressure in said space above a predetermined differential between said space and the changing fluid pressure during each cycle of operation of the piston.

12. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to the pressure within the dome and the other end to the pressure fluid for operating the valve, a double acting check valve and seat controlling charging and discharging of fluid to and from the space between said seals, and biasing means for urging the check valve toward its seat, said biasing means permitting unseating of the check valve when the pressure within the space between the seals is more or less than the valve operating fluid pressure by predetermined amounts.

13. As a subcombination, a chamber, a passageway through which fluid may be charged and discharged from the chamber, and a double acting check valve and seat controlling flow through the passageway to control charging and discharging of the chamber comprising, a slide valve seat, a valve member slidably engageable with said seat, annular sliding seal means for sealing between the seat and valve member, said seal means carried by one of said seat and valve member, opposed resilient means urging the valve member toward seated position with said seat, said resilient means permitting unseating of the valve member when the pressure within the chamber is more or less by predetermined amounts than the pressure outside the chamber to which the check valve is subjected, and means for rendering ineffective one of said resilient means when the check valve is unseated by movement in a direction opposed by the other of said resilient means.

14. As a subcombination: a two-way differential pressure flow valve comprising a valve body having a bore through which fluid flow can be in either direction, a piston valve element reciprocal between two positions in said bore, seal means carried by one of the valve body and piston valve element forming a sliding seal therebetween when the piston valve element is at a position intermediate said two positions to prevent flow through said bore, resilient means biasing the piston valve element toward said intermediate position, and by-pass passageways carried by the other of said piston valve element and body not carrying the seal means, said passageways being disposed to either side of the seal means when said element is in its intermediate position and respectively extending across the seal means when said piston valve element is in either of its extreme positions.

15. As a subcombination: a two-way differential pressure flow valve comprising a valve body having a bore through which fluid can flow in either direction, a piston valve element reciprocal between first and second positions and a third position intermediate said first and second positions, means forming a seal between the valve body and element to prevent flow through said bore when said element is in said intermediate position, means interrupting the seal formed by said seal means upon movement of said element to either of said first and second positions to permit fluid to then flow through said bore, and resilient means biasing said element toward said intermediate position so as to prevent flow through said bore until a predetermined difference in pressures is applied to opposite ends of said element.

16. As a sub-combination: a two-way differential flow valve comprising a valve body having a flow passageway therethrough through which fluid can flow in either direction, a valve member in said flow passageway, said valve member and body being reciprocal relative to each other between two positions, seal means carried by one of the body and member forming a sliding seal therebetween when the body and member are positioned relative to each other to be at a position intermediate said two positions to prevent flow through said flow passageway, resilient means biasing at least one of the body and member toward said intermediate position, and by-pass passageways carried by the other of said body and member not carrying the seal means, said by-pass passageways being respectively disposed to either side of the seal means when said body and member are positioned relative to each other to be in said intermediate position and respectively extending across the seal means when said body and member are positioned relative to each other to be in said intermediate position and respectively extending across the seal means when said body and member are positioned relative to each other to be in either of said two positions.

17. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to pressure within the dome and the other end to the pressure fluid for operating the valve, and means for automatically charging the space between the seals with pressure fluid to a pressure having a predetermined relation with dome pressure during operations of the valve.

18. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to pressure within the dome and the other end to the pressure fluid for operating the valve, means for automatically charging the space between the seals with valve operating pressure fluid to a pressure having a predetermined relation with dome pressure during operation of the valve, and means for isolating said spaced seals from further increase in operating fluid pressure upon full opening of the valve.

19. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to pressure within the dome and the other end to the pressure fluid for operating the valve, a check valve and seat controlling charging of the annular space between the two seals, and means biasing the check valve toward its seat by force which will give a predetermined pressure differential between the valve operating fluid and the fluid within said space at the instant of unseating of the valve member.

20. In a pressure responsive valve of the type having snap action characteristics, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to the pressure within the dome and the other end to the pressure fluid for operating the valve, a check valve and seat controlling charging of the annular space between the two seals, and means biasing the check valve toward its seat with a force whose pressure equivalent is equal to the differential between the fluid operating pressure and the dome pressure at the instant of opening of the valve.

21. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to the pressure within the dome and the other end to the pressure fluid for operating the valve, and means for automatically exhausting any excess fluid pressure in said space above a pressure having a predetermined relationship with the dome pressure during operation of the piston.

22. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to the pressure within the dome and the other end to the pressure fluid for operating the valve, means for automatically exhausting any excess fluid pressure in the space between the seals above a pressure having a predetermined relationship with the dome pressure during operation of the piston, and means for isolating said spaced seals from further increase in operating fluid pressure upon full opening of the valve.

23. In a pressure responsive valve, a body having a flow passageway therethrough, a valve member and seat controlling flow through the passageway, a pressure dome including a piston reciprocal in a cylinder in the body, said piston connected to the valve member to open and close the valve member with reciprocation of the piston, spaced annular sliding seals between the piston and cylinder, one end of said piston exposed to the pressure within the dome and the other end to the pressure fluid for operating the valve, a check valve and seat controlling exhausting of fluid from the space between the seals, and means biasing the check valve toward its seat by a force which will give a predetermined differential across the check valve to provide a pressure in said space which has a predetermined relationship to the pressure in said dome during operation of the piston.

24. As a subcombination, a piston reciprocal within a cylinder therefor, said piston exposed on one end to a fluid resistance and reciprocated by the application of changing fluid pressure applied to the other end, spaced annular sliding seals between the piston and cylinder, and means responsive to the changing fluid pressure for returning the pressure within the space between said seals to a value having predetermined relationship with the fluid resistance including means for automatically recharging the space between the seals upon reciprocation of the piston to replenish any leakage from said space.

25. As a subcombination, a piston reciprocal within a cylinder therefor, said piston exposed on one end to a fluid resistance and reciprocated by the application of changing fluid pressure applied to the other end, spaced annular sliding seals between the piston and cylinder and means responsive to the changing fluid pressure for returning the pressure within the space between said seals to a value having predetermined relationship with the fluid resistance including means for automatically exhausting any excess fluid pressure in said space above a predetermined differential between said space and the changing fluid pressure during operations of the piston.

References Cited in the file of this patent
UNITED STATES PATENTS

| | | |
|---|---|---|
| 2,090,781 | Camner | Aug. 24, 1937 |
| 2,153,774 | Poitras et al. | Apr. 11, 1939 |
| 2,570,647 | Cormier | Oct. 9, 1951 |
| 2,685,886 | Peters | Aug. 10, 1954 |